J. J. McGUCKIN.
BICYCLE STEERING HEAD.
APPLICATION FILED NOV. 5, 1921.

1,428,601.

Patented Sept. 12, 1922.

INVENTOR
John J. McGuckin.
BY
Andrew Wilson.
ATTORNEY

Patented Sept. 12, 1922.

1,428,601

UNITED STATES PATENT OFFICE.

JOHN J. McGUCKIN, OF BROOKLYN, NEW YORK.

BICYCLE STEERING HEAD.

Application filed November 5, 1921. Serial No. 513,181.

*To all whom it may concern:*

Be it known that I, JOHN J. McGUCKIN, a citizen of the United States, residing in the borough of Brooklyn, city of New York, N. Y., have invented certain new and useful Improvements in Bicycle Steering Heads, of which the following is a specification.

My invention relates particularly to means for attaching the handle bar stem to the fork head in such a manner that the handle bar stem will not work loose or wabble in its relation to the fork head, but will firmly maintain its proper relation thereto, while at the same time the locking means may be readily released whenever it is desired to readjust or separate the parts.

In the standard forms of bicycles the stem of the handle bar is telescoped within the fork head, and the lower end of the stem is then expanded within the fork head, or the upper end of the fork head is contracted around the stem. This results in making a close connection between the stem and head at one point only, and leaving the stem unsupported by any gripping relation to the fork head at either the upper end of the head or at the lower end of the stem. Hence, in use, play develops between the stem and fork head at one or other of the points mentioned, which is apt to weaken, distort or even break one or the other of the parts.

Furthermore, when the head is contracted around the shank, it is necessary to split the head in several places to permit the contraction, thereby weakening the head, and incurring the danger of the contracted portions cracking or breaking away from the head when in use. I overcome these objections by making certain substitutions in and additions to standardized types of bicycle handle bar stems and forks, so that the stem and fork head will be locked together at both the lower end of the stem and at the upper end of the fork, so as to effectually prevent any play or rocking between them, while, at the same time the fork head remains a complete, unslotted tube retaining all the strength incident to such a construction.

Figure 1:
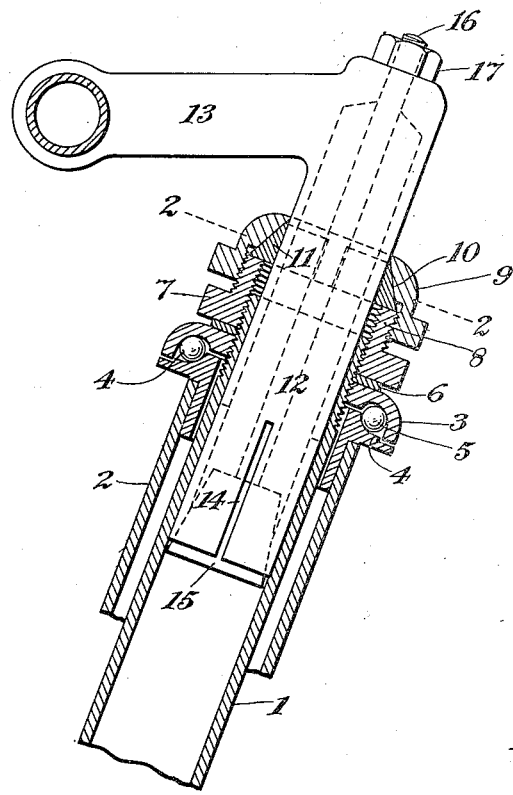
Figure 2:
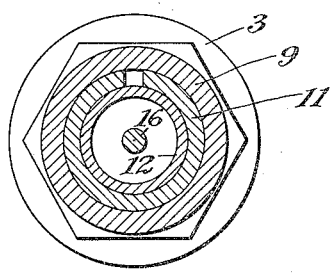

In the drawings, Fig. 1 is a vertical, sectional view of a bicycle handle bar stem and a fork head secured together in my improved manner; and Fig. 2 is a cross sectional view taken on the line 2—2 of Fig. 1.

Similar parts are designated by similar reference numerals in both the figures.

The tubular fork head 1 is telescoped within the bicycle head 2, and has threaded upon it, in the usual manner, the ball bearing cap 3 which cooperates with the race 4 on the top of the head 2 to provide the runway for the ball bearings 5. Over the cap 3 is preferably placed a lock washer 6, above which a lock nut 7 is threaded upon the fork head 1. This lock nut 7 is provided with an exteriorly threaded shank 8, which preferably projects somewhat above the top of the fork head when the parts are assembled.

Threaded upon the shank 8 is a nut 9 having an inturned flange at its top, the flange being provided with an inwardly expanding bevel 10 adapted to cooperate with a complementary bevel on the outside of a split collar 11 placed within the nut 9 on top of the shank 8 of nut 7 and around the stem 12 of the handle bar 13.

The lower end of the stem 12 is split, as at 14, and the tapered head 15 of a bolt 16 may be drawn up within the stem by means of the nut 17 so as to expand the stem into locking relation within the fork head.

When the cap 3 has been properly adjusted it may be locked by the lock nut 7; after which the nut 9 may be screwed down on the shank 8 of nut 7, thereby compressing the split ring 11 around the stem 12, so as to securely lock the top of the fork head to the stem, effectually preventing any play between the stem and the top of the fork head. This arrangement clamps both the top of the fork head to the handle bar stem, and the bottom of the stem to the fork head, positively preventing play between them; while at the same time by simply slacking off the nuts 9 and 17 the parts may be released for adjustment or separation whenever desired.

It is obvious that details of construction may be modified as by the use of mechanical equivalents without departing from the spirit of my invention as described and claimed.

Having thus described my invention what I claim and desire to secure by Letters Patent of the United States is:—

1. In a bicycle, the combination of a non-contractible tubular fork-head, a handle bar stem telescoped therein, means for locking the lower end of said stem to the fork-head, a contractible element surrounding said stem, and cooperating retracting and contracting means carried by the fork head for clamping the upper end of the fork-head to said stem.

2. In a bicycle, the combination of a non-contractible tubular fork-head, a handle bar stem telescoped therein, retractible expanding means and retractible contracting means for clamping the fork-head and stem to each other at two longitudinally separated points.

3. In a bicycle, the combination of a tubular, non-contractible fork-head, a handle bar stem telescoped therein, means for expanding the lower end of said stem within the fork head, radially contractible means, and cooperating contracting means rotatably mounted on the upper end of the fork-head to clamp the same to the stem.

4. In a bicycle, the combination of a handle bar stem, a non-contractible fork-head, a ball race cap threaded thereupon, a lock nut thread upon the fork-head and provided with an exteriorly threaded shank, a split ring above such shank, and a nut threaded upon the shank and adapted to contract the split ring.

5. In a bicycle, the combination of a handle bar stem, a non-contractible fork-head, a contractible element above the fork-head, and means mounted upon the fork-head for contracting the contractible element above the handle bar stem.

JOHN J. McGUCKIN.